United States Patent
Bae

(10) Patent No.: US 7,433,723 B2
(45) Date of Patent: *Oct. 7, 2008

(54) SPRING MODULE FOR A SLIDING-TYPE PORTABLE TERMINAL

(75) Inventor: Chul-Ho Bae, Uiwang-si (KR)

(73) Assignee: Samsung Electronics Co., Ltd (KR)

(*) Notice: Subject to any disclaimer, the term of this patent is extended or adjusted under 35 U.S.C. 154(b) by 403 days.

This patent is subject to a terminal disclaimer.

(21) Appl. No.: 10/943,373

(22) Filed: Sep. 17, 2004

(65) Prior Publication Data

US 2005/0095995 A1 May 5, 2005

(30) Foreign Application Priority Data

Oct. 29, 2003 (KR) .................. 10-2003-0075844

(51) Int. Cl.
*H04M 1/00* (2006.01)

(52) U.S. Cl. ................. 455/575.4; 455/575.1
(58) Field of Classification Search ............. 455/575.4, 455/575.1; 267/69; 292/17
See application file for complete search history.

(56) References Cited

U.S. PATENT DOCUMENTS

| 5,335,274 | A | * | 8/1994 | Masuda et al. ......... 379/433.12 |
| 5,482,438 | A | * | 1/1996 | Anderson et al. .......... 417/44.1 |
| 6,151,485 | A | * | 11/2000 | Crisp ...................... 455/575.4 |
| 6,822,871 | B2 | * | 11/2004 | Lee et al. .................... 361/727 |
| 6,963,756 | B2 | * | 11/2005 | Lubowicki et al. ........ 455/550.1 |
| 7,162,283 | B2 | * | 1/2007 | Bae et al. ................. 455/575.4 |
| 2002/0102866 | A1 | | 8/2002 | Lubowicki |
| 2002/0137476 | A1 | * | 9/2002 | Shin ............................ 455/90 |
| 2003/0064688 | A1 | * | 4/2003 | Mizuta et al. ................ 455/90 |
| 2004/0203496 | A1 | * | 10/2004 | Bae et al. ................... 455/90.1 |
| 2005/0054393 | A1 | * | 3/2005 | Fagerstrom et al. ...... 455/575.1 |

* cited by examiner

*Primary Examiner*—Lewis G West
(74) *Attorney, Agent, or Firm*—The Farrell Law Firm, PC

(57) ABSTRACT

A spring module in a sliding-type portable terminal has a first housing and a second housing. In a predetermined portion of the length of the first housing, the spring module applies an elastic force in a direction in which the second housing slides to cover the first housing. In the remaining portion of the length of the first housing, the spring module applies the elastic force in a direction in which the second housing slides to expose the first housing. As a consequence, the elastic force generated by the spring module provides for semi-automatic opening/closing of the sliding-type portable terminal.

31 Claims, 14 Drawing Sheets

SPRING MODULE FOR A SLIDING-TYPE PORTABLE TERMINAL

PRIORITY

This application claims priority under 35 U.S.C. § 119 to an application entitled "Spring Module for a Sliding-Type Portable Terminal" filed in the Korean Intellectual Property Office on Oct. 29, 2003 and assigned Serial No. 2003-75844, the contents of which are incorporated herein by reference.

BACKGROUND OF THE INVENTION

1. Field of the Invention

The present invention relates generally to a portable terminal, and in particular, to a spring module for a sliding-type portable terminal configured such that a second housing opens/closes to reveal a keypad located in a first housing by sliding along the first housing.

2. Description of the Related Art

In general, portable terminals are classified into a bar type, a flip type, and a folder type according to their looks.

A bar-type portable terminal is configured to have a data input/output device, a transmitter, and a receiver in a single body housing. Since a keypad, functioning as a data input device, is exposed all the time, it may malfunction. Also, the constraint of the distance between the transmitter and the receiver limits miniaturization of the portable terminal.

A flip-type portable terminal is comprised of a body, a flip, and a hinge module connecting the body to the flip. A data input/output device, a transmitter, and a receiver are provided in the body. Despite the advantage of malfunction prevention due to the flip covering the keypad, the flip-type portable terminal has limitations in miniaturization due to the distance constraint between the transmitter and the receiver.

A folder-type portable terminal includes a body, a folder and a hinge module rotatably connecting the body to the folder. Along with rotation of the folder, the body is opened/closed. When the folder is closed, the malfunction of the keypad is prevented in an idle mode. In a call mode, the folder is opened, providing a sufficient distance between the transmitter and the receiver. Therefore, the folder-type portable terminal is feasible for miniaturization. That's why the folder-type portable terminal accounts for a major proportion of portable terminals.

In the flip-type or folder-type portable terminal, once the flip or folder rotates away from the body at or above a predetermined angle by the hinge module, it is driven to be opened without receiving any further force. Conversely, at or below the predetermined angle, the flip or folder is driven to be closed to the body.

Meanwhile, among diverse portable terminal designs, a sliding-type portable terminal has been increasingly used. The sliding-type portable terminal is configured to have two housings. One of the housings slides over the other housing, thereby opening/closing the portable terminal.

However, configurations of the sliding-type portable terminal proposed so far have not been particularly popular. Moreover, manually sliding one of the housings relative to the other in order to open/close the sliding-type portable terminal may be inconvenient.

SUMMARY OF THE INVENTION

An object of the present invention is to substantially solve at least the above-mentioned problems and/or disadvantages and to provide at least the advantages disclosed below.

Accordingly, an object of the present invention is to provide a sliding-type portable terminal in which a housing is easily opened/closed.

The above object is achieved by providing a spring module for a sliding-type portable terminal having a first housing and a second housing. At least one first sliding slit is extended in a predetermined shape lengthwise on the first housing. A second sliding slit is extended perpendicular to the length of the first housing on the second housing, which faces the first sliding slit and linearly reciprocates lengthwise along the first housing. At least one slider is engaged in the first and second sliding slits. Along with the linear reciprocation of the second housing, the slider slides in both the first and second slits simultaneously. A spring applies a force that moves the slider to one end of the first sliding slit, when the slider is within a first portion of the first sliding slit, and applies a force that moves the slider to the other end of the first sliding slit, when the slider is within a second portion of the first sliding slit.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention.

Figure 1:
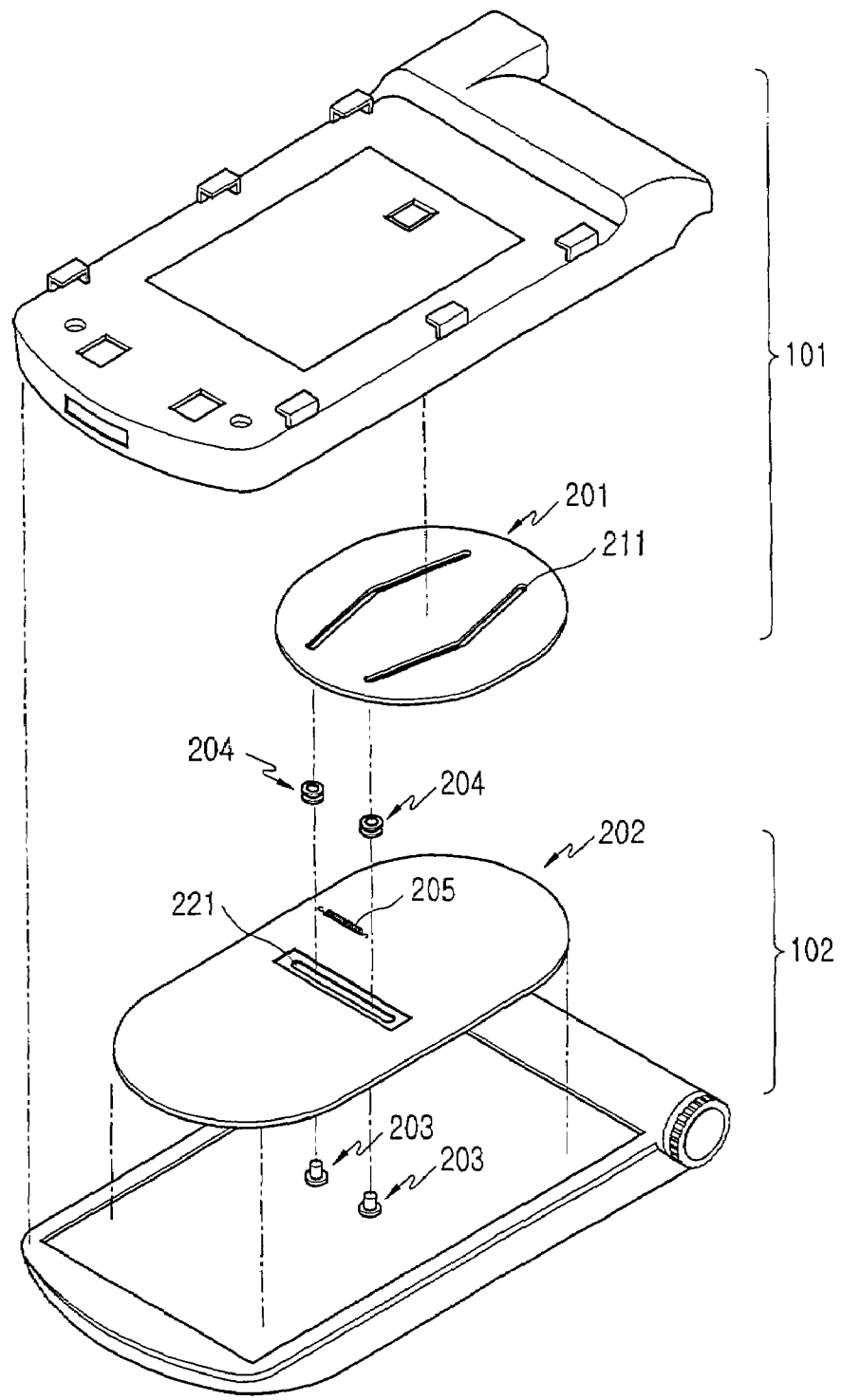
FIG. 1 is an exploded perspective view of a sliding-type portable terminal with a spring module according to an embodiment of the present invention.

FIG. 1 is an exploded perspective view of a sliding-type portable terminal 100 with a spring module 200 configured according to one embodiment of the present invention. Referring to FIG. 1, the portable terminal 100 comprises a first housing 101, a second housing 102 engaged with the first housing 102 in a face-to-face relationship, and the spring module 200 between the first and second housings 101 and 102 for generating an elastic force sufficient to slide the first and second housings 101 and 102 relative to one another between closed and open positions.

Figure 2:
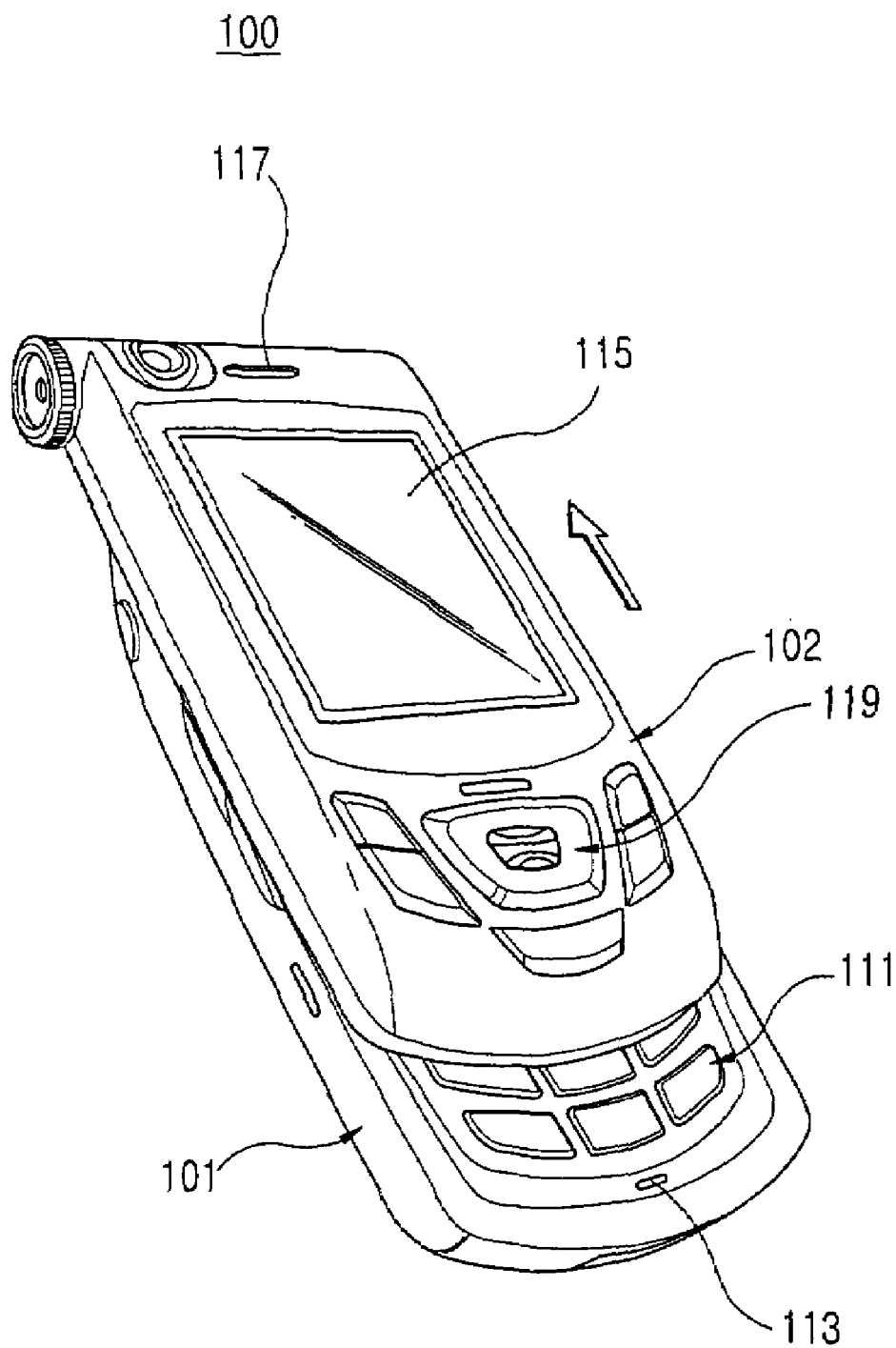
FIG. 2 is a perspective view of the sliding-type portable terminal illustrated in FIG. 1.
Figure 3:
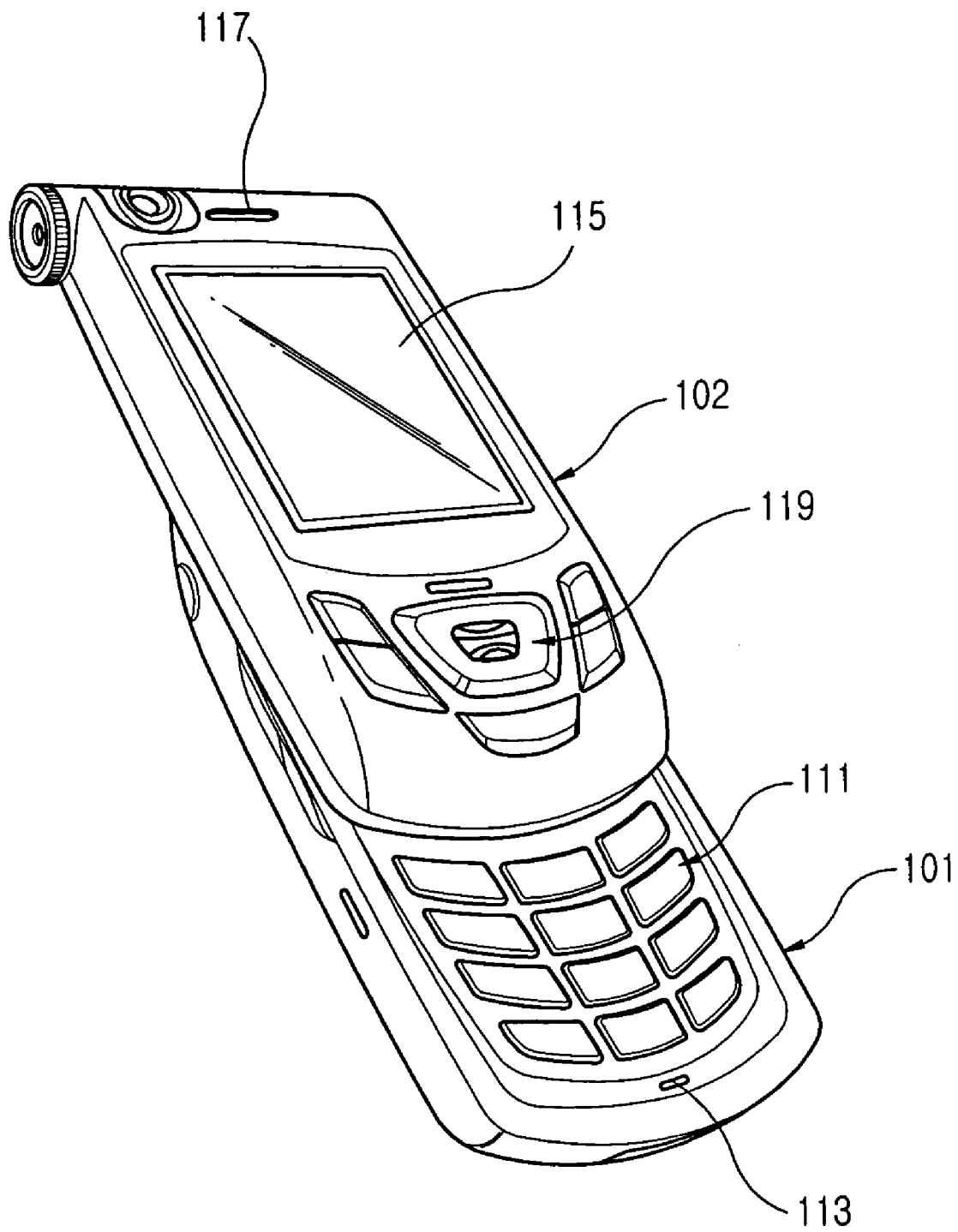
FIG. 3 is a perspective view illustrating the opened state of the sliding-type portable terminal illustrated in FIG. 1.
Figure 4:
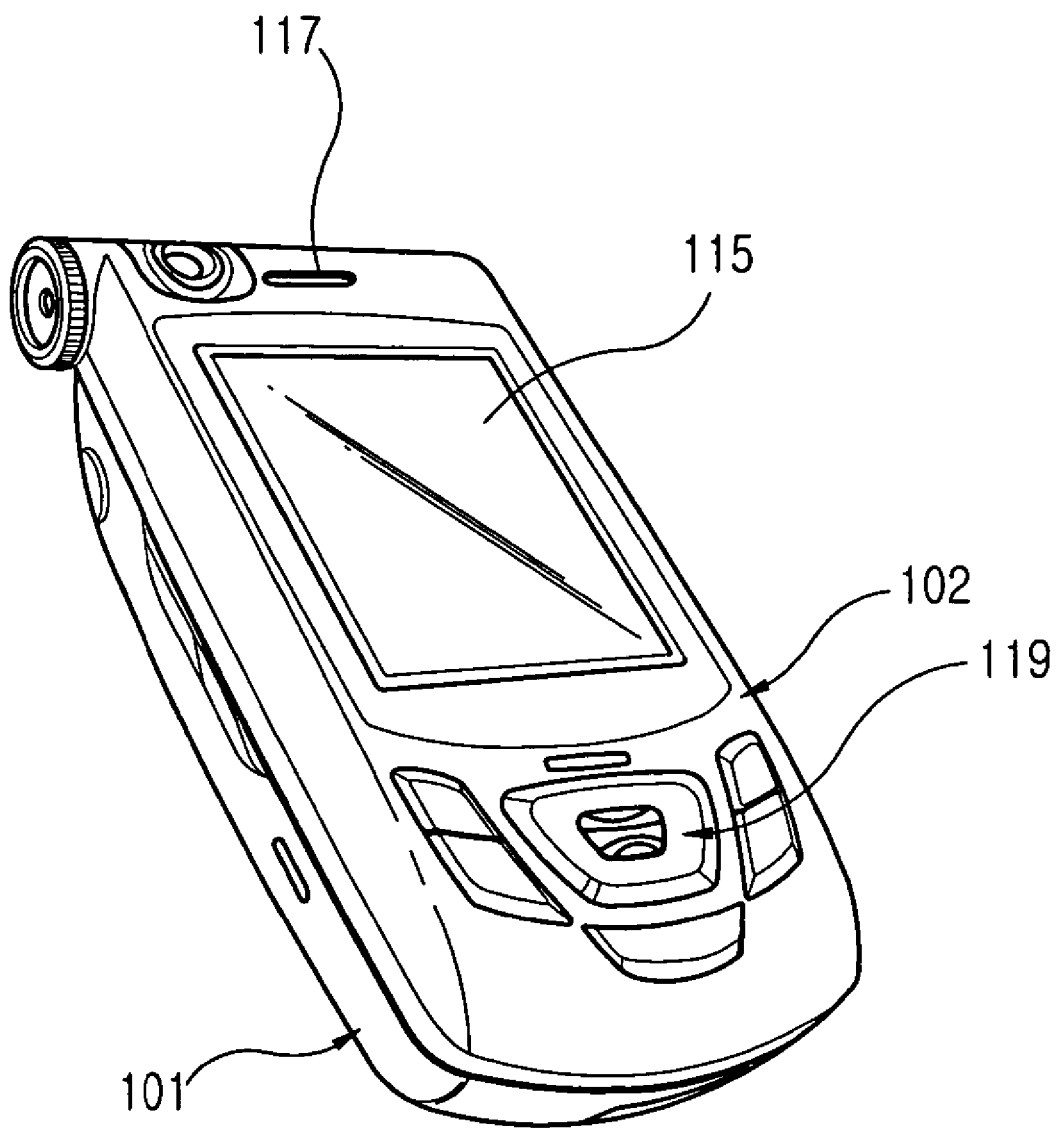
FIG. 4 is a perspective view illustrating the closed state of the second housing in the sliding-type portable terminal illustrated in FIG. 1.
Figure 5:
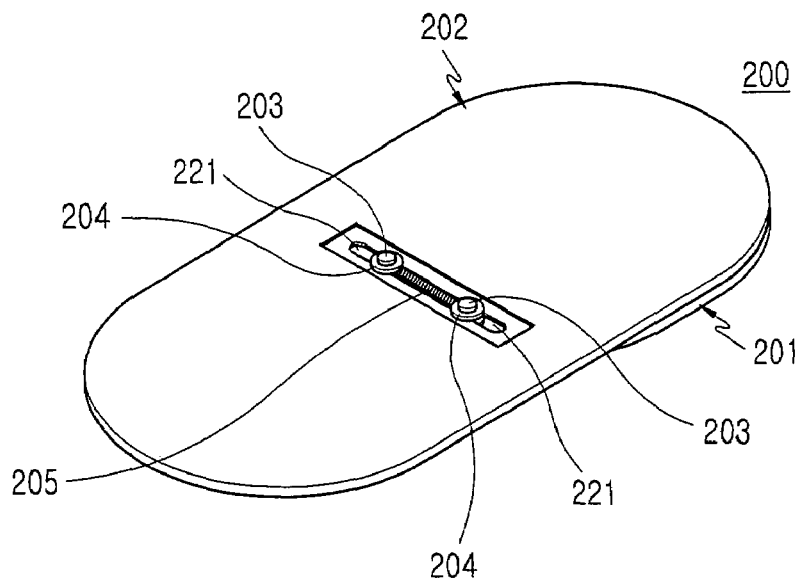
FIG. 5 is an assembled perspective view of the spring module illustrated in FIG. 1.
Figure 6:
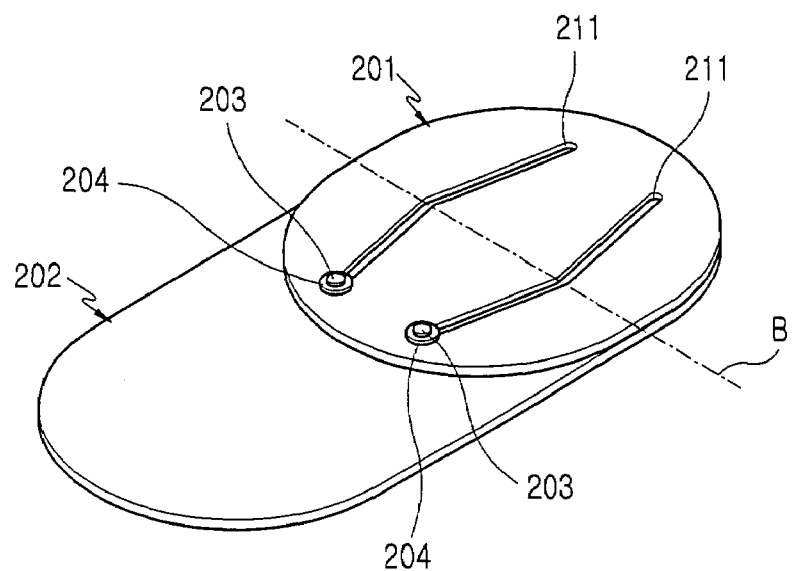
FIG. 6 is an assembled perspective view illustrating the rear surface of the spring module illustrated in FIG. 1.
Figure 7:
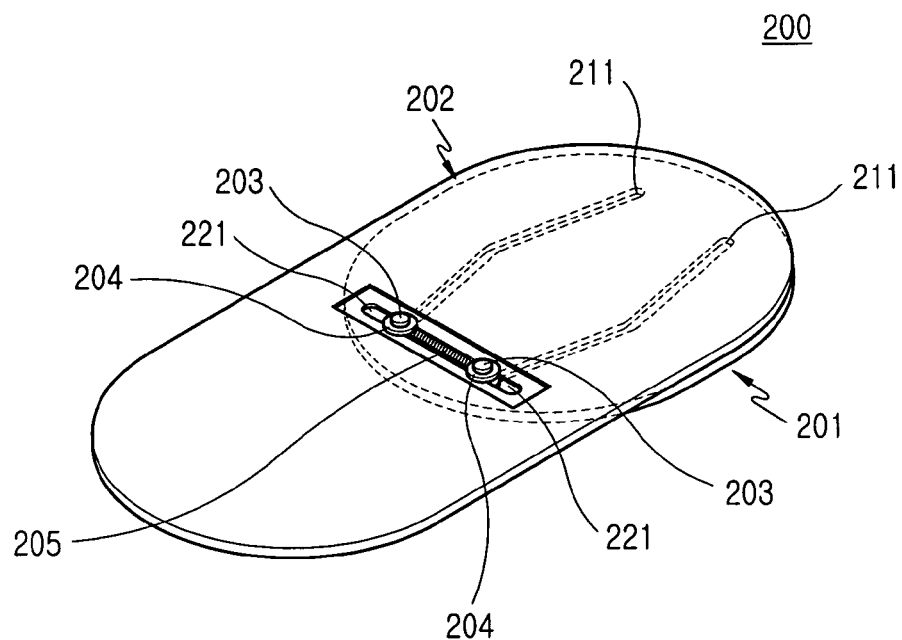
FIGS. 7, 8 and 9 illustrate the operation of the spring module illustrated in FIG. 1.
Figure 8:
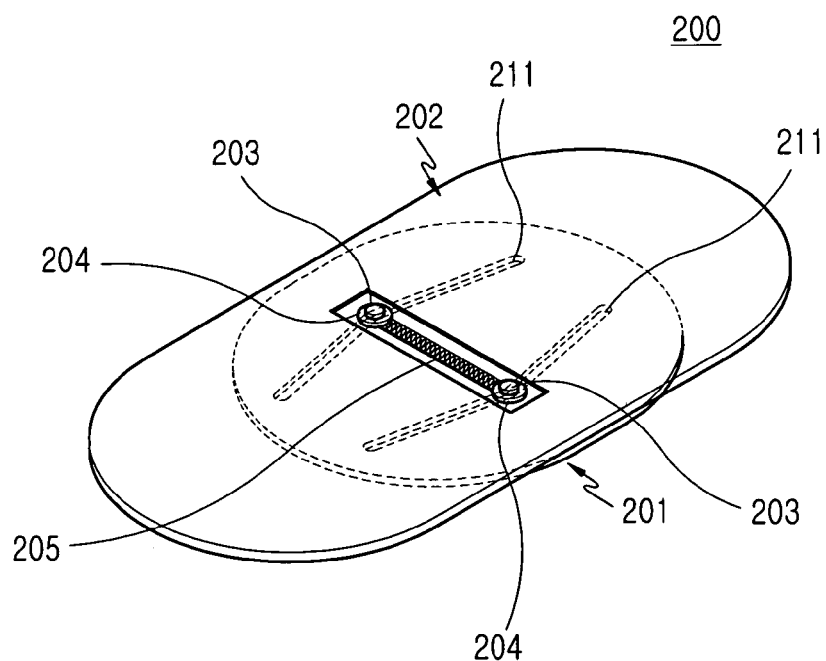
Figure 9:
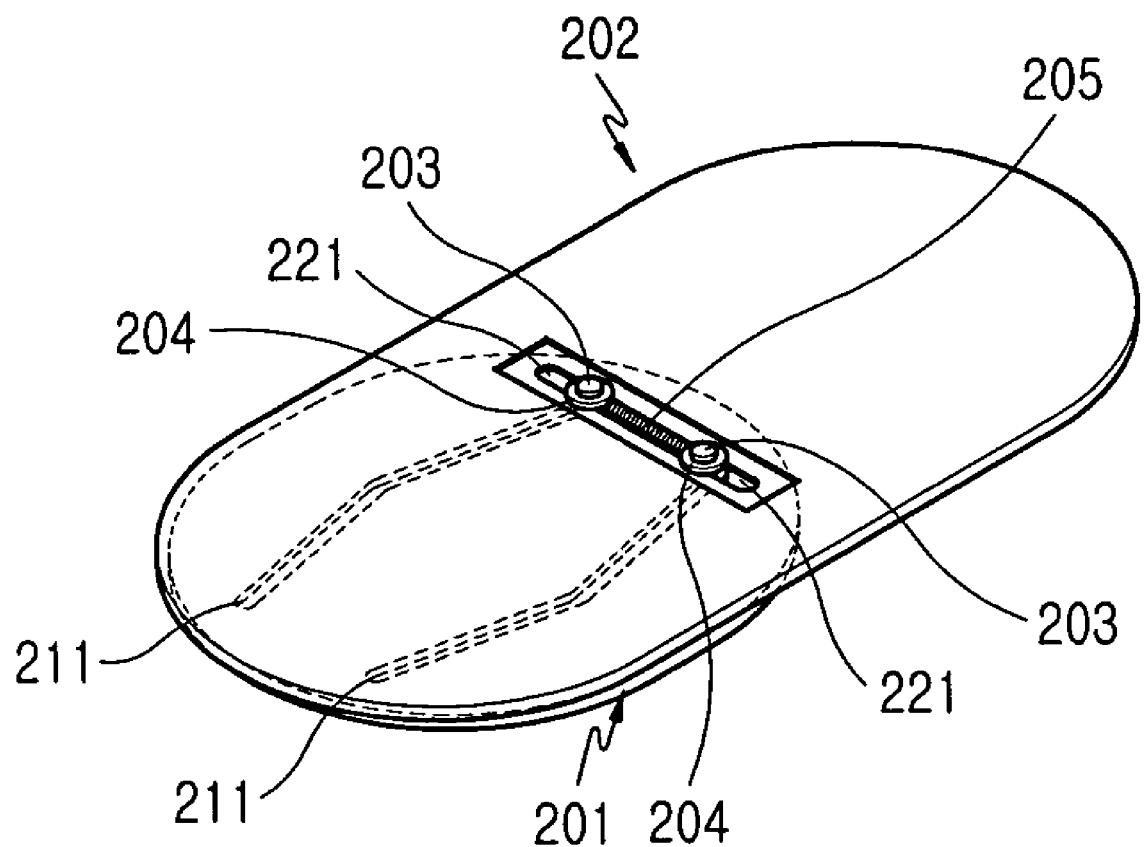

Referring to FIGS. 2, 3 and 4, the first housing 101 is provided, at a front surface thereof, with a keypad 111 (see FIGS. 2, 3) and a transmitter 113 with a microphone incorporated therein. As the second housing 102 slides lengthwise over the first housing 101, the keypad 111 and the transmitter 113 are exposed or covered.

The second housing 102 is engaged with the first housing 101 in such a way that it can slide along the length direction of the first housing 101. On the front surface of the second housing 102 are disposed a receiver 117 with a speaker phone incorporated therein (see FIGS. 2-4), a display device 115 formed of an LCD (Liquid Crystal Display) and a TFT (Thin-Film Transistor), and predetermined function keys 119. Once the second housing 102 is within a predetermined range on its way toward the closed position of the terminal 100 in response to a force applied by the user, its further displacement to the closed position, as shown in FIG. 4, is caused by an elastic force applied thereto by the spring module 200. On the other hand, if the second housing 102 is opened beyond the predetermined range relative to the first housing 101, the elastic force from the spring module 200 applied to the second housing 102 is sufficient to move it further to the open position relative to the first housing 101, as illustrated in FIG. 3.

Referring to FIG. 1 and FIGS. 5 to 9, the spring module 200 includes a first guide plate 201, a second guide plate 202, and a pair of sliders 203. First sliding slits 211, which are symmetrical with respect to a longitudinal axis B extended through midpoints of the first sliding slits 211, are formed in the first guide plate 201 and have a predetermined shape, whereas a second sliding slit 221 is extended perpendicular to the length of the first housing 101 and transversely to the first sliding slits 211 in the second guide plate 202. The sliders 203 are inserted in both the first and second slits 211 and 221 so that they can slide in response to the predetermined elastic force.

As better seen in FIG. 1, the first guide plate 201 with the first sliding slits 211 formed therein is attached onto an upper frontal surface of the first housing 101. The first sliding slits 211 each are generally V-shaped and extend along the predetermined distance in the longitudinal direction of the first housing. Preferably these slits are provided symmetrically relative to the longitudinal axis of the first housing 101 and face one another so that their apexes are spaced from one another at a predetermined distance greater than a distance between their opposite ends.

The second guide plate 202 is attached to the rear surface of the second housing 102 (FIG. 1) facing the first guide plate 201. The second sliding slit 221 is extended perpendicular to the length of the first housing 101 and transversely to the first sliding slits 211. The second guide plate 202 formed with the second sliding slit 221 moves together with the second housing 102 along the length direction of the first housing 101 so that the second sliding slit faces and overlaps the first sliding slits 211. The sliders 203 extend through the first sliding slits 211 and the second sliding slit 221 and travel along the first sliding slits 211 as the second housing 102 along with the second guide plate 202 slide relative to the first guide plate 201. Furthermore, the sliders 203 are also displaceable along the second sliding slit 221.

While the first and second sliding slits 211 and 221 are formed as holes penetrating the first and second guide plates 201 and 201, it can be further contemplated that they are formed as grooves having a predetermined depth on the predetermined surfaces of the first and second plates 201 and 202.

A tension coil spring 205 provided between the sliders 203 is configured to generate a tension elastic force biasing the sliders 203 toward one another. Consequently, the elastic force generated by the tension coil spring 205 is applied to the sliders 203 biasing them towards one another as the sliders move between the opposite ends of the first sliding slits 211 At the same time, the sliders 203 are in engagement with the second sliding slit 221, which slides therewith relative to the first sliding slits 211 as the housings 101 and 102 move longitudinally relative to one another. With respect to a position at which the first sliding slits 211 are farthest from each other, the sliders 203 can move to either of the opposite ends of the first sliding slits 211 initially by an external force applied by the user to the second housing 102 and further, upon reaching the predetermined range, by the elastic force applied thereto by the tension coil spring 205. Bushings 204 may be fit around to minimize friction involved in the slider's sliding along both the first and second sliding slits 211 and 221.

As a user moves the second housing 102 to an open position relative to the first housing 101 in the sliding-type portable terminal 100 having the above-described spring module 200, the elastic force of the coil spring 205 may assist or resist the user to open the terminal. If the user moves the second housing 102 to a position short of where the distance between the first sliding slits 211 is the largest, that is the distance between the apexes of the V-shaped sliding slits 211, the elastic force is applied so as to make the second housing 102 slide back and cover the first housing 101, provided that the force applied by the user has been ceased. On the other hand, if the user moves the second housing 102 beyond the position where the distance between the first sliding slits 211 is the largest, the elastic force is applied so that the second housing 102 slides without the user's assistance to expose the first housing 101.

The opening/closing speed of the second housing 102 can be controlled by adjusting the angle at which the first sliding slits 211 are inclined. The more obtuse the apex angle of each of the first guiding slits 211, the slower displacement of the second housing 102 and conversely.

The sliding-type portable terminal 100 with the spring module 200 can be so configured that the first guide plate 201 is attached to the rear surface of the second housing 102 and the second guide plate 202 to the front surface of the first housing 101 by modifying the opening/closing mechanism of the first and second housings 101 and 102 and correspondingly changing the position relationship between the first and second sliding slits 211 and 221.

To provide the elastic force so that the sliders 203 slide toward one ends or the other ends of the first sliding slits 211, the first sliding slits 211 can be formed to have such a shape that they are relatively close to each other at their centers and relatively far away from each other at both ends. In this case, a compressed coil spring is installed between the sliders 203 to provide the elastic force biasing the sliders 203 away from one another once they pass the nadirs of the first sliding slits 211.

With reference to FIGS. 10 to 15, a spring module 300 in a sliding-type portable terminal according to another embodiment of the present invention will be described. As illustrated in FIGS. 10 to 15, the spring module 300 includes a first guide plate 301 with first sliding slits 311 formed therein and symmetrical with respect to a latitudinal axis B extended through midpoints of the first sliding slits 311, a second guide plate 302 with a second sliding slit 321 formed therein, a guide bar 304 fit in the second sliding slit 321, and a pair of sliders 303 for receiving the predetermined elastic force.

The first and second guide plates 301 and 302 are configured in the same manner as in the first embodiment of the present invention. Thus, their description is not provided here.

Figure 10:
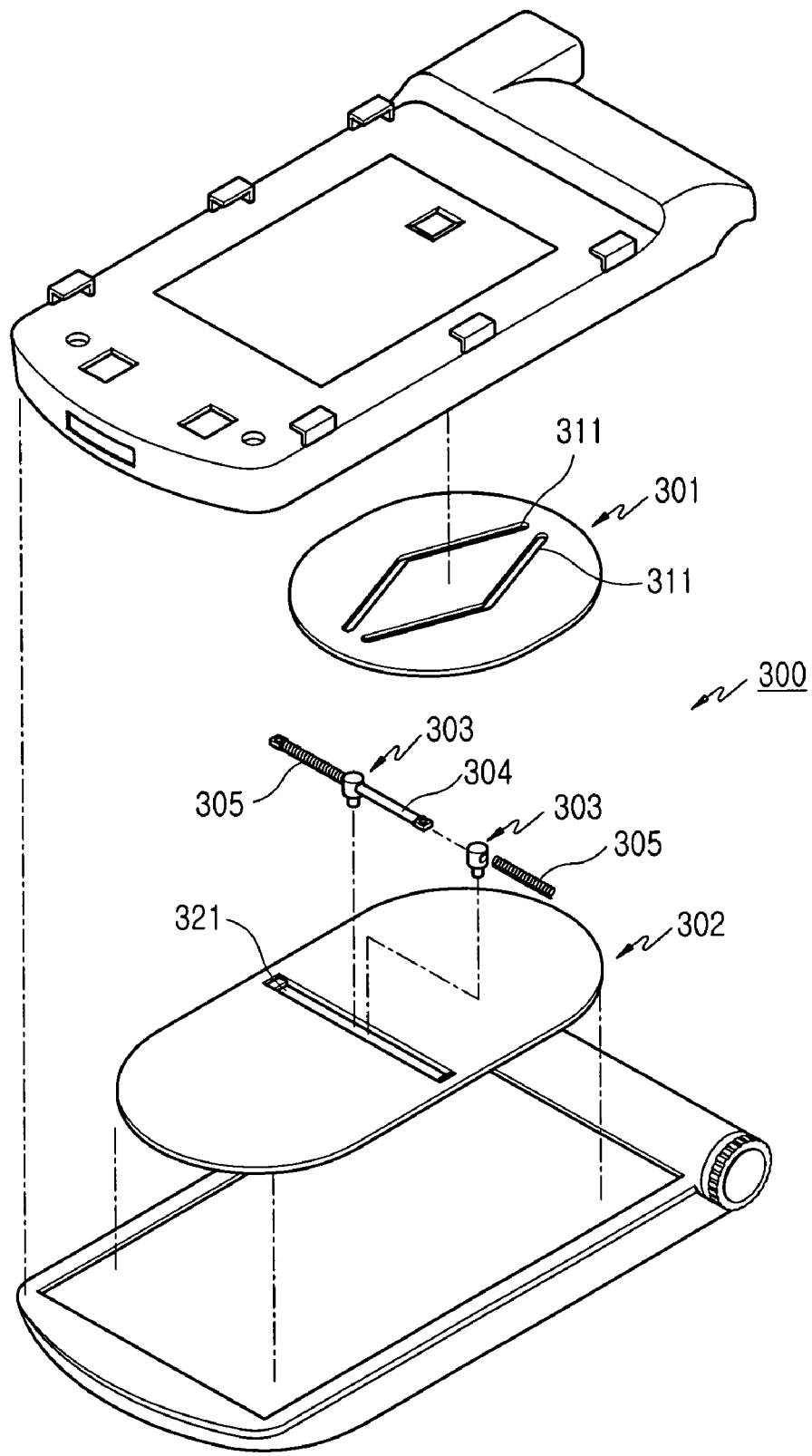
FIG. 10 is an exploded perspective view of a sliding-type portable terminal with a spring module according to another embodiment of the present invention.
Figure 11:
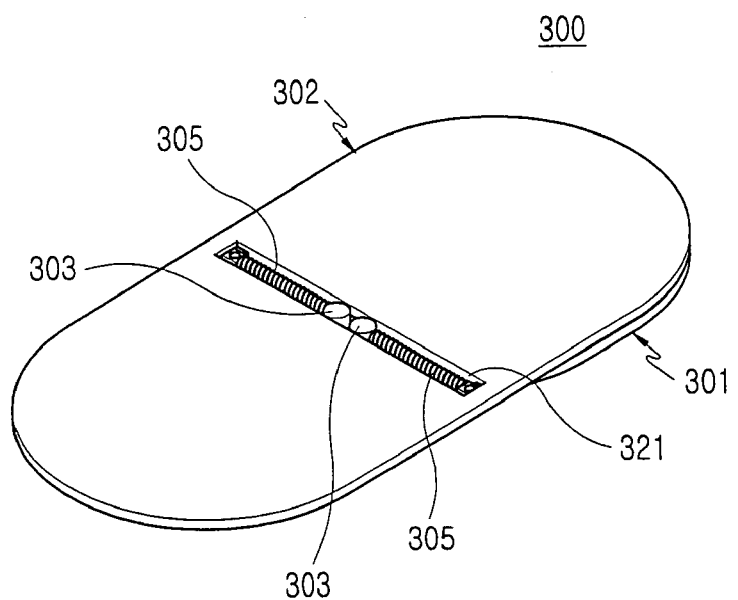
FIG. 11 is an assembled perspective view of the spring module illustrated in FIG. 10.
Figure 12:
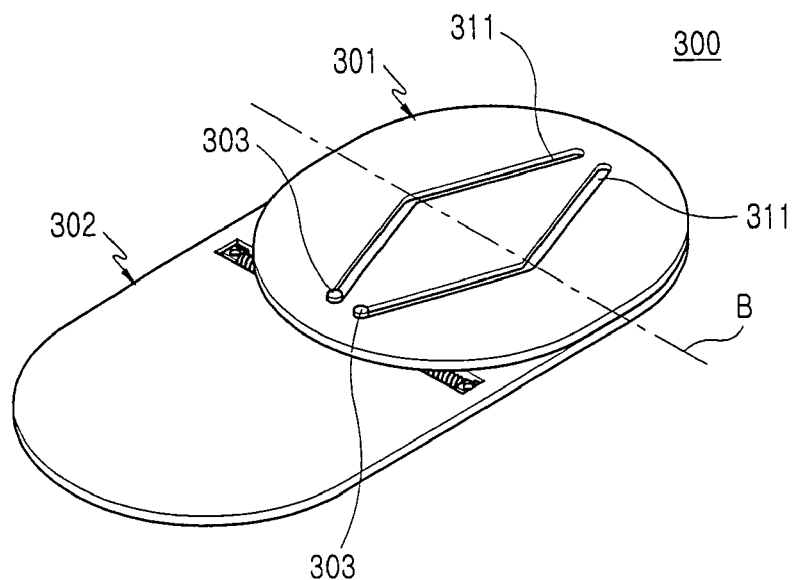
FIG. 12 is an assembled perspective view illustrating the rear surface of the spring module illustrated in FIG. 10.
Figure 13:
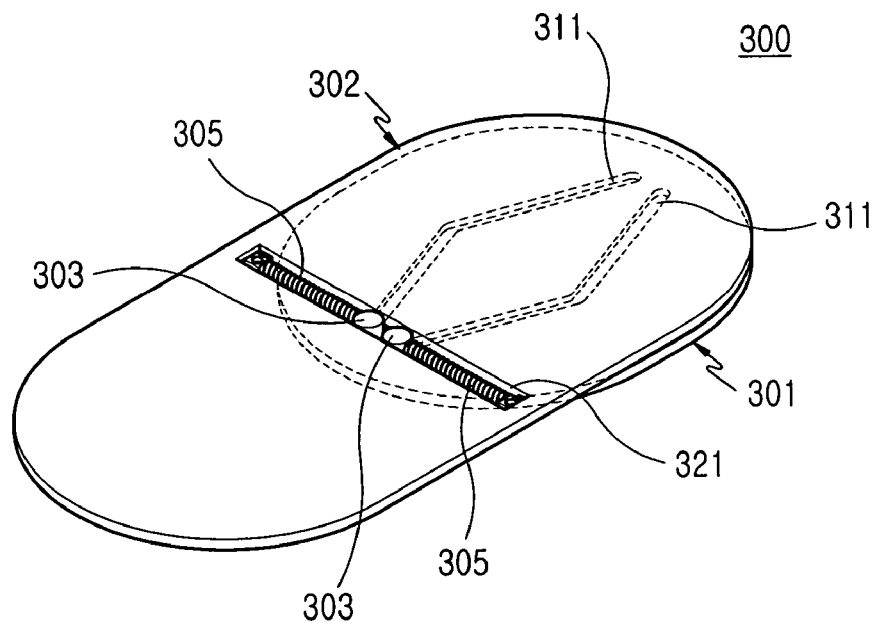
FIGS. 13, 14 and 15 illustrate the operation of the spring module illustrated in FIG. 10.
Figure 14:
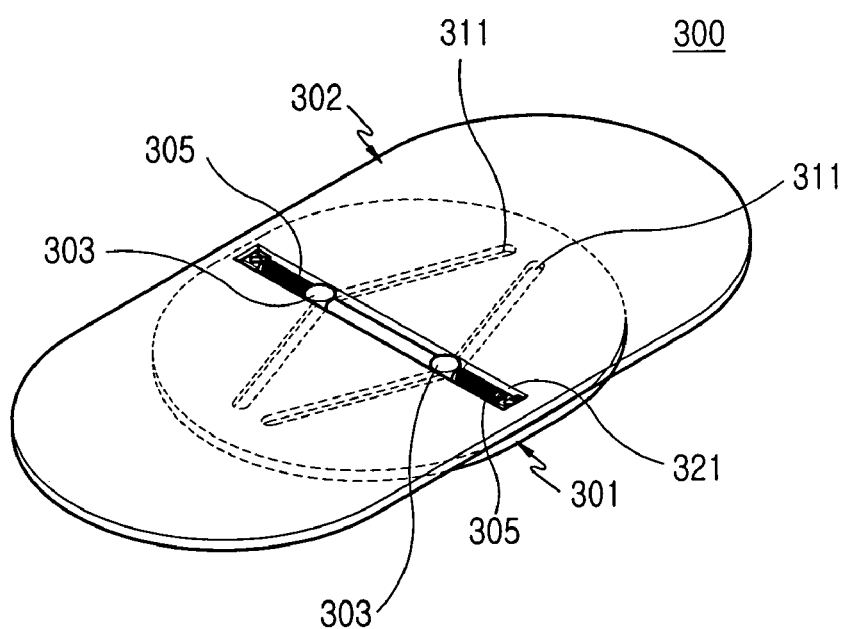
Figure 15:
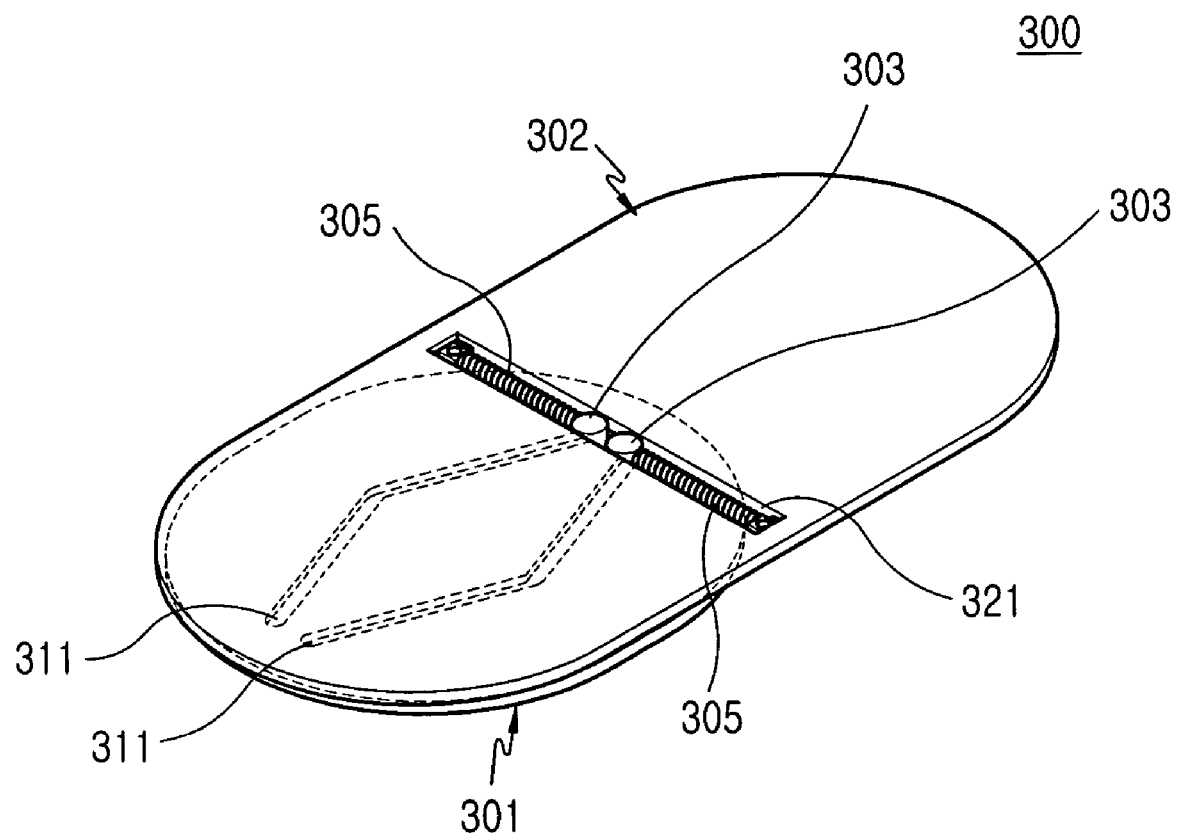

The sliders 303 are installed at positions where the first and second sliding slits 311 and 321 intersect. Each of the sliders 303 is provided with a predetermined through hole to allow the guide bar 304 to extend therethrough. That is, the guide bar 304 guides the movement of the sliders 303. A tensile coil spring 305 installed on the guide bar 304 may be installed between the sliders 303. Alternatively, there are two compressed coils springs 305 each installed outside a respective one of the sliders 303, as shown in FIGS. 10 and 11. In either case, the sliders 303 are biased towards one another by the elastic force produced by the tensile coil spring or compressed springs 305.

The sliders 303 slide to either one of the opposite ends of the first sliding slits 311, which are relatively near to each other, by the elastic force applied thereto by the compressed coil spring or springs 305, as in the first embodiment of the present invention. That is, when the second sliding slit 321 advances together with the sliders 303 toward the centers of the first sliding slits 311, where they are the farthest from each other, the elastic force is accumulated in the compressed coil spring(s) 305 and applied in the direction in which the sliders 303 approach each other. The sliders 303 must move to the ends of the first sliding slits 311 to narrow the distance between the sliders 303. Therefore, the second sliding slit 321 engaged with the sliders 303 moves lengthwise along the first housing as the second housing moves lengthwise along the first housing.

Figure 16:
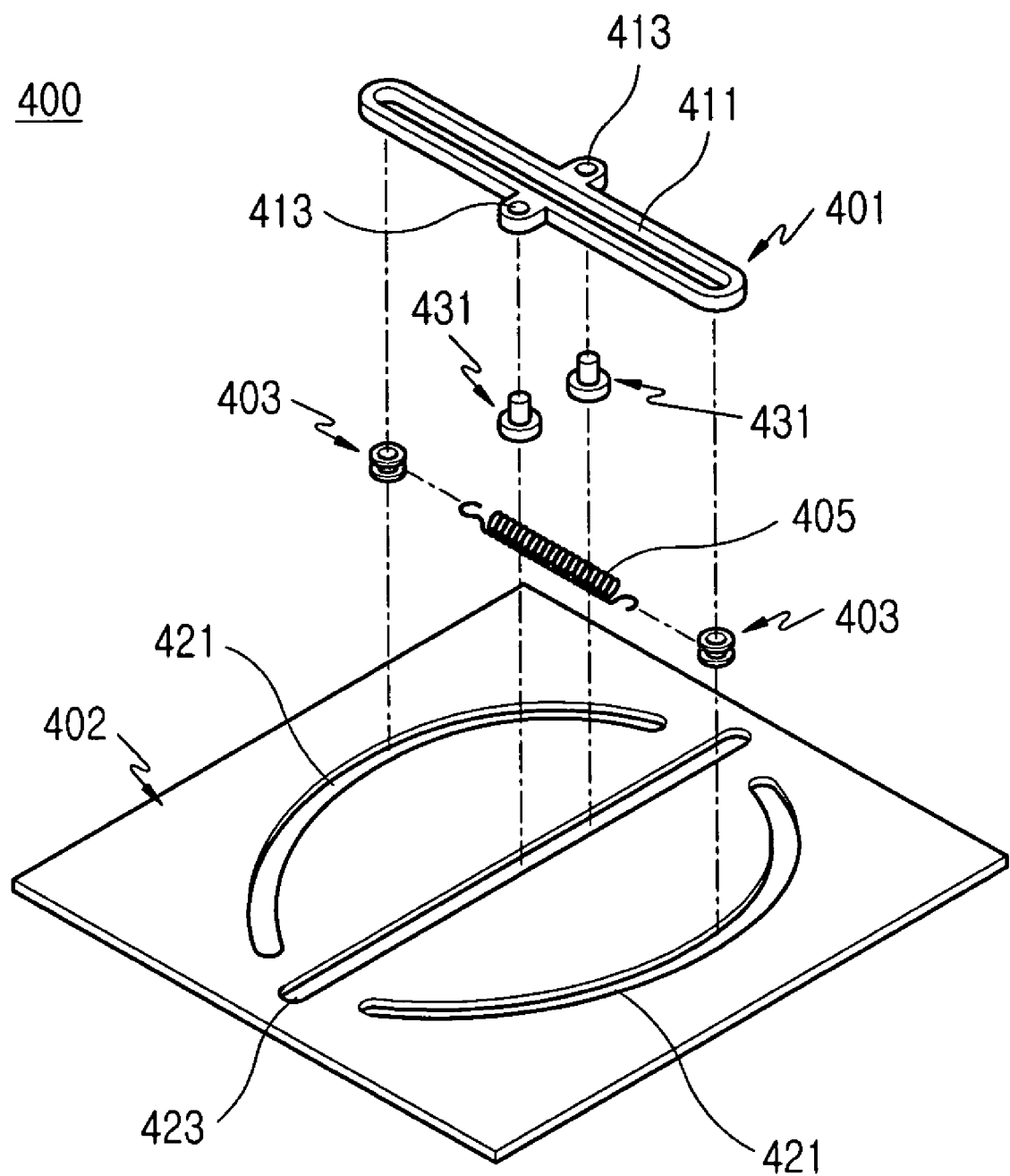
FIG. 16 is an exploded perspective view of a sliding-type portable terminal with a spring module according to a third embodiment of the present invention.
Figure 17:
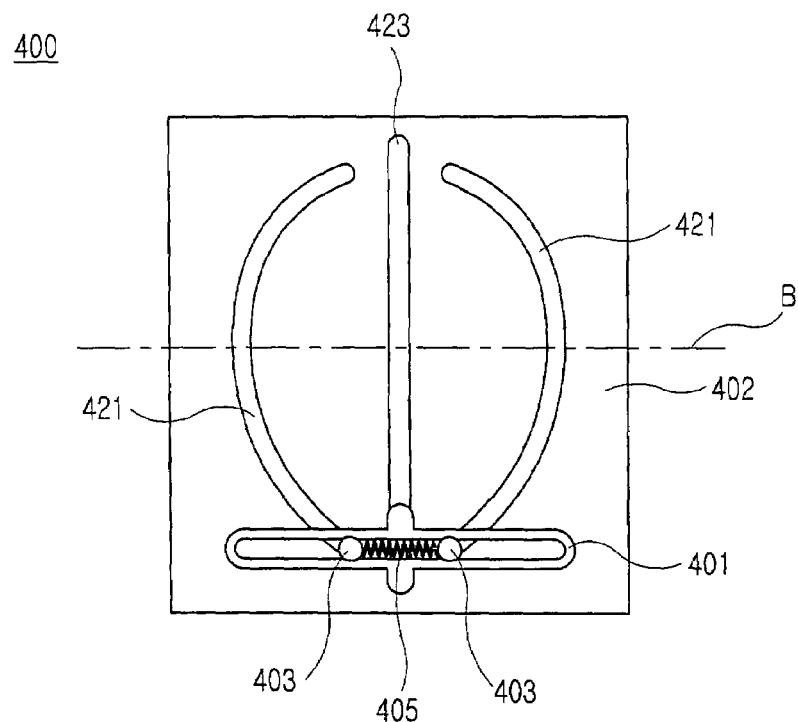
FIGS. 17, 18 and 19 illustrate the operation of the spring module illustrated in FIG. 16.
Figure 18:
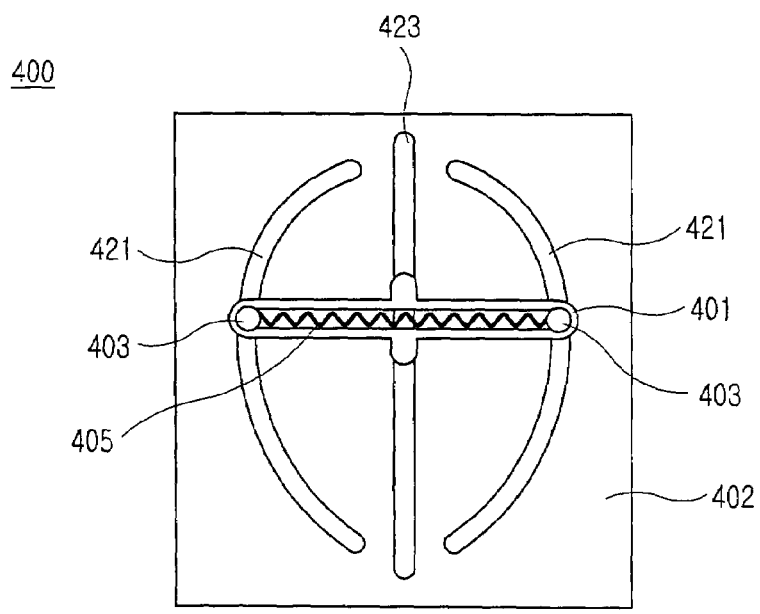
Figure 19:
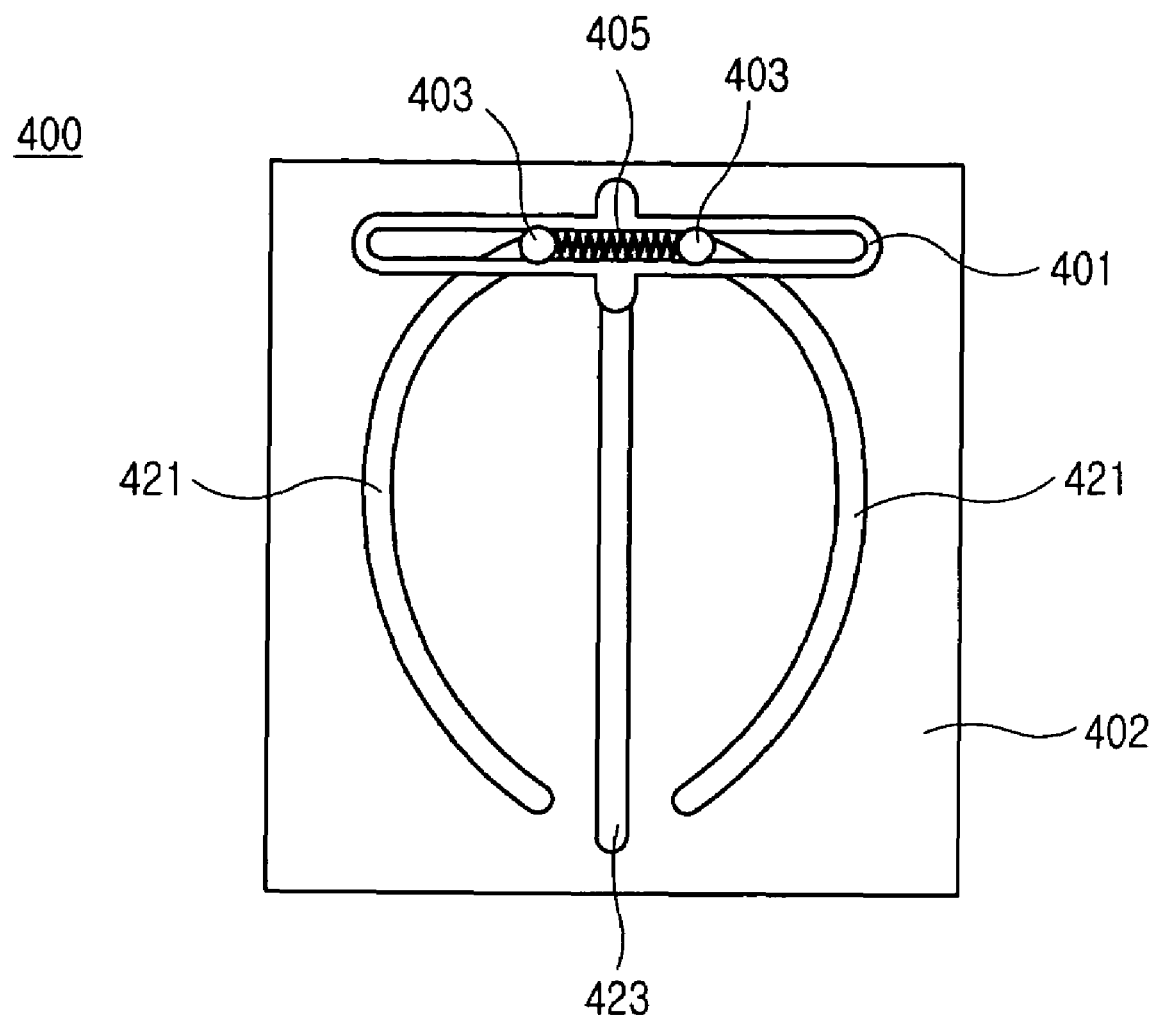

With reference to FIGS. 16 and 17, a spring module 400 in a sliding-type portable terminal according to a third embodiment of the present invention will be described. As illustrated in FIGS. 16 and 17, the spring module 400 includes a guide plate 402 with a pair of first sliding slits 421 formed therein and symmetrical with respect to a longitudinal axis B extending through midpoints of the first sliding slits 421, a guide frame 401 with a second sliding slit 411 formed therein, and a pair of sliders 403 engaged in the second sliding slit 411 so that they can linearly move along the first and second sliding slits 421, 411, respectively.

On the guide plate 402, the first sliding slits 421 of a predetermined curvature are formed symmetrically with respect to a guide groove 423 extending lengthwise parallel to and located between the first sliding slits 421. The distance between the first sliding slits 421 is the widest at their centers and becomes gradually narrow toward both ends thereof.

The guide frame 401 is provided with the second sliding slit 411 extended perpendicular to the length of the guide groove 423. The guide frame 401 is attached to the guide plate 402 so that it can linearly slide on the guide plate 402. The guide frame 401 is provided with a pair of engagement holes 413 at positions corresponding to the guide groove 423. Guide pins 431 are inserted into the engagement holes 413 through the guide groove 423 to linearly guide the guide frame 401 along the guide groove 423 relative to the guide plate 402.

The sliders 403 extend through the first guiding slits 421 and the second sliding slit 411 and can slide in both the first and second sliding slits 421 and 411. The sliders 403 are biased towards one another by a spring 405 which generates an elastic force biasing the sliders 403 towards one another as they move to one of the opposite ends of the first sliding slits 421. Alternatively, to direct the elastic force so that the sliders 403 are biased towards one another, two compressed coil springs each can be inserted outside each of the sliders 403 within the second slit 411, as is discussed in the second embodiment of the present invention.

In the spring module 400 having the above-described configuration, as the sliders 403 move toward the centers of the first sliding slits 421 during displacement of the guide frame 401 on the guide plate 402, the elastic force is accumulated in the tension coil spring 405. Since the accumulated elastic force is applied in the direction in which the sliders 403 approach one another, the sliders 403 eventually move to the ends of the first sliding slits 421.

As described above, in a sliding-type portable terminal of the present invention, the first and second housings semi-automatically slide relative one another between the open and closed positions in response to the elastic force produced by the coil spring. The shapes of first and second sliding slits intersecting at a predetermined position and facing each other are shaped and dimensioned so that the sliders upon reaching the desired position between the fist and second housings in response to a force applied by the user can further move automatically along the sliding slits in response to the elastic force to open or close the portable terminal. Therefore, a user can use the sliding-type portable terminal conveniently.

While the invention has been shown and described with reference to certain preferred embodiments thereof, they are mere exemplary applications.

The first sliding slits are shaped such that the gap between them becomes narrow toward both ends thereof and an elastic force is applied to a pair of sliders so that they approach each other in the above-described three embodiments of the present invention. However, it can be further contemplated that the first sliding slits are shaped such that the gap between them becomes wider toward both ends thereof and an elastic force is applied to the pair of sliders so that they recede from each other. Also, while the first sliding slits are positioned symmetrically, as explained above, the shape of the first sliding slits 211, 311 and 421 in the embodiments of the present invention can be so configured that their midpoints are spaced apart at a relatively large or relatively small distance.

Therefore, it will be understood by those skilled in the art that various changes in form and details may be made therein without departing from the spirit and scope of the invention as defined by the appended claims.

What is claimed is:

1. A spring module for a sliding-type portable terminal, comprising:

at least one first sliding slit extending longitudinally on a first housing of the portable terminal and having a first end, a second end and a predetermined shape, the first housing having a longitudinal axis;

a second sliding slit extending perpendicular to the longitudinal axis and provided on a second housing of the portable terminal, the second sliding slit facing the at least one first sliding slit;

at least one slider engaged in the at least one first and second sliding slits and coupled to one of the first and second housings, the at least one slider being operative to reciprocally slide in both the at least one first and second sliding slits simultaneously; and at least one spring for applying an elastic force to move the at least one slider to the first end when the slider is within a first portion of the at least one first sliding slit, and to the second end when the slider is within a second portion of the at least one first sliding slit, thereby opening or closing the sliding-type portable terminal, the at least one spring being one of a tension spring and a compression spring, wherein the predetermined shape is symmetrical with respect to a latitudinal axis extending through a midpoint of the at least one first sliding slit.

2. The spring module of claim 1, wherein the at least one first sliding slit is inclined in a first direction with respect to the longitudinal axis in the first portion, and inclined in a second direction opposite to the first direction with respect to the longitudinal axis in the second portion.

3. The spring module of claim 1, wherein the at least one first sliding slit is shaped in a predetermined curvature.

4. The spring module of claim 1, further comprising an additional first sliding slit, wherein the at least one first and additional first sliding slits face each other and are located symmetrically with respect to the longitudinal axis.

5. The spring module of claim 4, wherein the at least one first and additional first sliding slits extend from the first ends to the second ends longitudinally to recede from each other along the first portion and to approach each other along the second portion, the spring module further comprising an additional slider engaging the additional first sliding slit and the second sliding slit, wherein the at least one and additional sliders are biased relative to one another in response to the elastic force.

6. The spring module of claim 5, wherein a midpoint distance between the midpoints of the at least one first and additional first sliding slits is greater than a first distance between the first ends and than a second distance between the second ends, the at least one spring being a coil spring extending between the at least one and additional sliders and applying the elastic force in a direction in which the sliders approach each other.

7. The spring module of claim 5, further comprising an additional spring spaced from the at least one spring so that each of the at least one and additional springs extends between a respective one of two ends of the second sliding slit and a respective one of the at least one and additional sliders, wherein a midpoint distance between the midpoints of the at least one first and additional first sliding slits is greater than a first distance between the first ends and than a second distance between the second ends, the at least one and additional springs biasing the at least one and additional sliders towards one another.

8. The spring module of claim 5, wherein a midpoint distance between the midpoints of the at least one first and additional first sliding slits is less than a first distance between the first ends and than a second distance between the second ends, the at least one spring being a compressed coil spring extending between the at least one and additional sliders and generating the elastic force biasing the at least one and additional sliders away from one another.

9. The spring module of claim 5, further comprising an additional spring spaced from the at least one spring so that each of the at least one and additional springs is braced against a respective one of two ends of the second sliding slit and a respective one of the at least one and additional sliders, wherein a midpoint distance between the midpoints of the at least one first and additional first sliding slits is less than a first distance between the first ends and than a second distance between the second ends, the at least one and additional springs being tension coil springs applying the elastic force biasing the at least one and additional sliders away from one another.

10. The spring module of claim 1, further comprising a first guide plate installed on the first housing and facing the second housing, wherein the first sliding slit is formed on the first guide plate.

11. The spring module of claim 10, wherein the first sliding slit is a groove formed on a top surface of the first guide plate and terminating at a distance on a bottom surface of the first guide plate.

12. The spring module of claim 1, further comprising:
a guide groove extending longitudinally along the first housing and spaced from the at least one first sliding slit; and
a guide protrusion fixed on the second housing and in the vicinity of the second sliding slit, for linearly reciprocating along the guide groove.

13. The spring module of claim 12, further comprising an additional first sliding slit, wherein the at least one first and additional first sliding slits are spaced symmetrically with respect to the guide groove.

14. The spring module of claim 1, further comprising a bushing fit around an outer circumferential surface of the at least one slider for reducing friction among the at least one slider and the at least one first and second sliding slits.

15. The spring module of claim 1, further comprising a guide bar extending within the second sliding slit, wherein the at least one slider linearly reciprocates on the guide bar.

16. The spring module of claim 1, further comprising a second guide plate installed on the second housing and facing the first housing, wherein the second sliding slit is formed on the second guide plate.

17. The spring module of claim 16, wherein the second sliding slit is a groove formed on a first surface of the second guide plate and terminating at a distance on a second surface of the second guide plate, wherein the first surface faces the at least one first sliding slit and is opposite to the second surface.

18. The spring module of claim 1, further comprising a guide frame extending perpendicularly to the longitudinal axis and coupled to the second housing so that the guide frame faces the first housing, wherein the second sliding slit is formed on the guide frame.

19. A spring module for a sliding-type portable terminal having a first housing and a second housing, the first housing having a longitudinal axis, the spring module comprising:
a pair of first sliding slits, each first sliding slit extending longitudinally on the first housing and having a predetermined shape, a first end and a second end opposite to the first end, wherein the first sliding slits face each other;
a second sliding slit extending perpendicular to the longitudinal axis and provided on the second housing, the second sliding slit facing the pair of first sliding slits;
a pair of sliders, each slider engaged in a respective one of the first sliding slits and in the second sliding slit, the sliders coupled to one of the first and second housings and being operative to reciprocally slide in both the first and second sliding slits simultaneously; and
at least one spring for applying an elastic force to move the sliders to the first ends when the sliders are within a first portion of the first sliding slits, and to the second ends when the sliders are within a second portion of the first sliding slits, thereby opening and closing the sliding-type portable terminal, the at least one spring being one of a tension spring and a compression spring,
wherein a midpoint distance between midpoints of the first sliding slits is greater than a first distance between the first ends and than a second distance between the second ends, the elastic force being applied in a direction that the sliders approach each other.

20. The spring module of claim 19, wherein the first sliding slits are inclined in a first direction with respect to the longitudinal axis in the first portion, and inclined in a second direction opposite to the first direction with respect to the longitudinal axis in the second portion.

21. The spring module of claim 19, wherein the first sliding slits are shaped in a predetermined curvature.

22. The spring module of claim 19, wherein the first sliding slits extend longitudinally to recede from each other along the first portion and to approach each other along the second portion, wherein the sliders are biased relative to one another in response to the elastic force.

23. The spring module of claim 22, further comprising an additional spring spaced from the at least one spring so that each of the at least one and additional springs extends between a respective one of two ends of the second sliding slit and a respective one of the sliders, wherein the at least one and additional springs biasing the sliders towards one another.

24. The spring module of claim 19, further comprising a first guide plate installed on the first housing and facing the second housing, wherein the first sliding slits are formed on the first guide plate.

25. The spring module of claim 24, wherein each of the first sliding slits is a groove formed on a top surface of the first guide plate and terminating at a distance on a bottom surface of the first guide plate.

26. The spring module of claim 19, further comprising:
a guide groove extending longitudinally along the first housing and so disposed that the first sliding slits are spaced symmetrically with respect to the guide groove; and
a guide protrusion fixed on the second housing and in the vicinity of the second sliding slit for linearly reciprocating along the guide groove.

27. The spring module of claim 19, further comprising a pair of bushings, each bushing fit around an outer circumferential surface of a respective one of the sliders for reducing friction among the respective one slider, the respective one first sliding slit and the second sliding slit.

28. The spring module of claim 19, further comprising a guide bar extending within the second sliding slit, wherein the sliders linearly reciprocate on the guide bar.

29. The spring module of claim 19, further comprising a second guide plate installed on the second housing and facing the first housing, wherein the second sliding slit is formed on the second guide plate.

30. The spring module of claim 29, wherein the second sliding slit is a groove formed on a first surface of the second guide plate and terminating at a distance on a second surface of the second guide plate, wherein the first surface faces the first sliding slits and is opposite to the second surface.

31. The spring module of claim 19, further comprising a guide frame extending perpendicularly to the longitudinal axis and coupled to the second housing so that the guide frame faces the first housing, wherein the second sliding slit is formed on the guide frame.

* * * * *